April 27, 1926.
M. COLLIS
1,582,382
HALF MOON ROLL MAKING MACHINE
Filed April 19, 1924   4 Sheets-Sheet 1
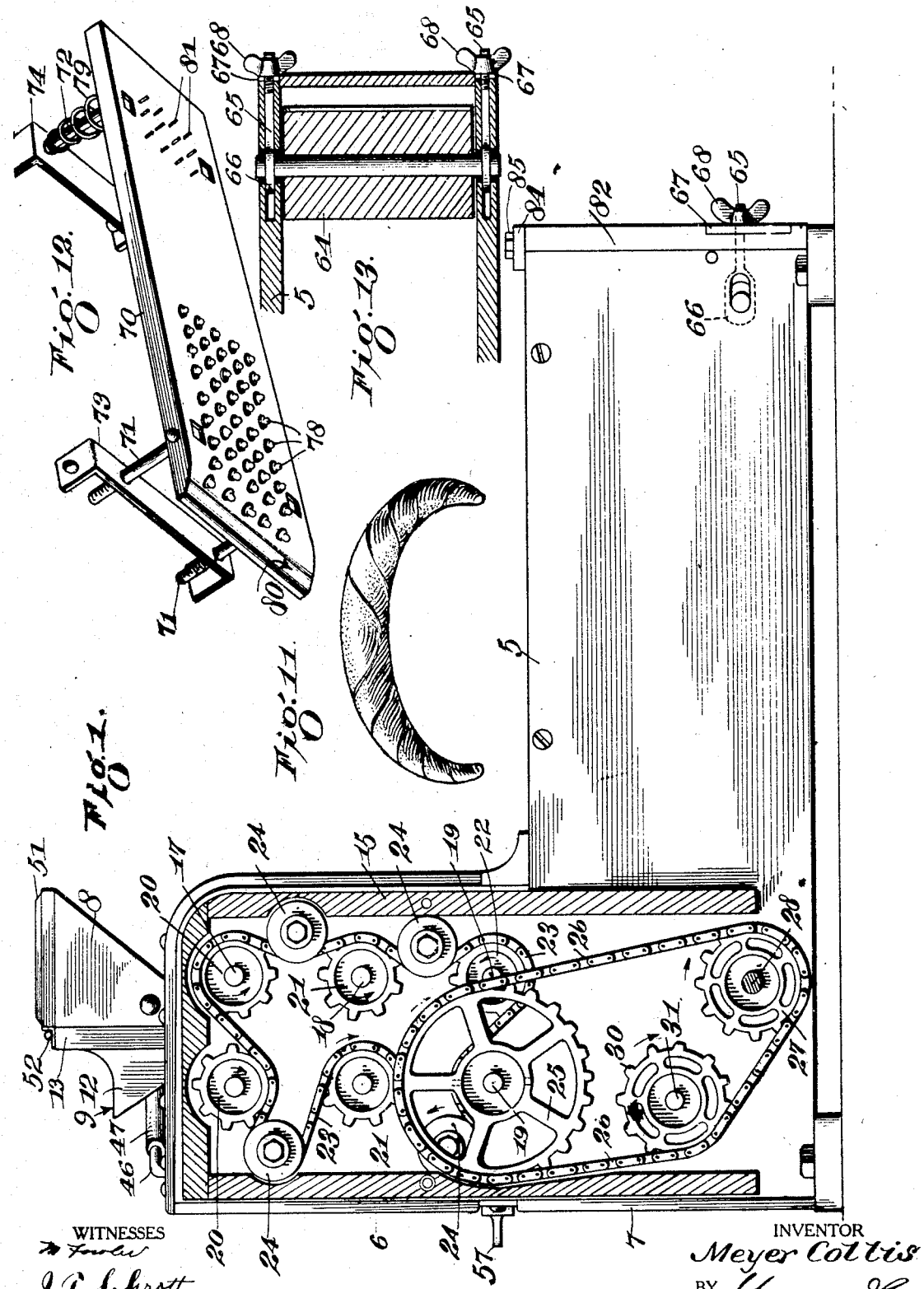
WITNESSES
INVENTOR
Meyer Collis
BY
ATTORNEYS

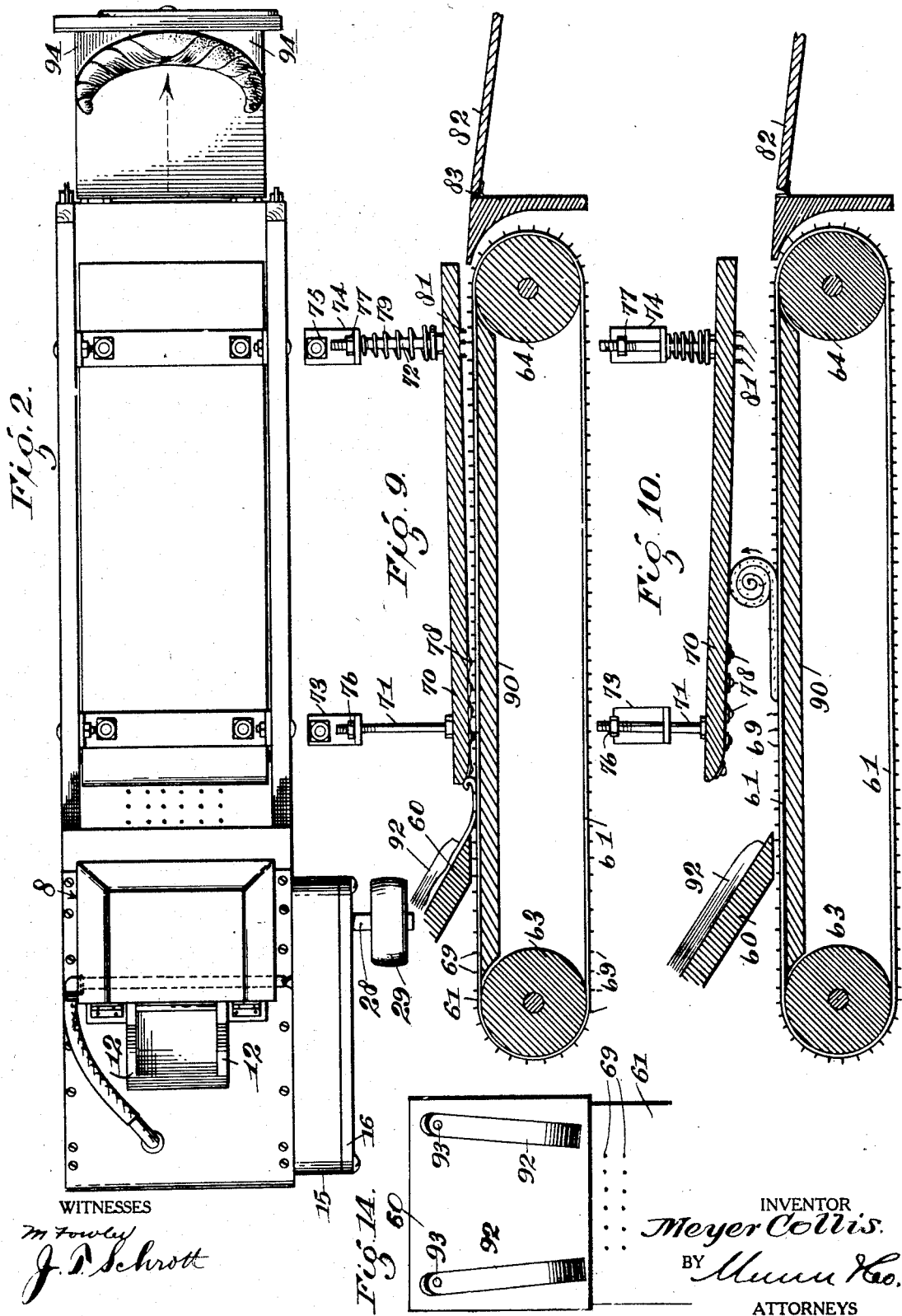

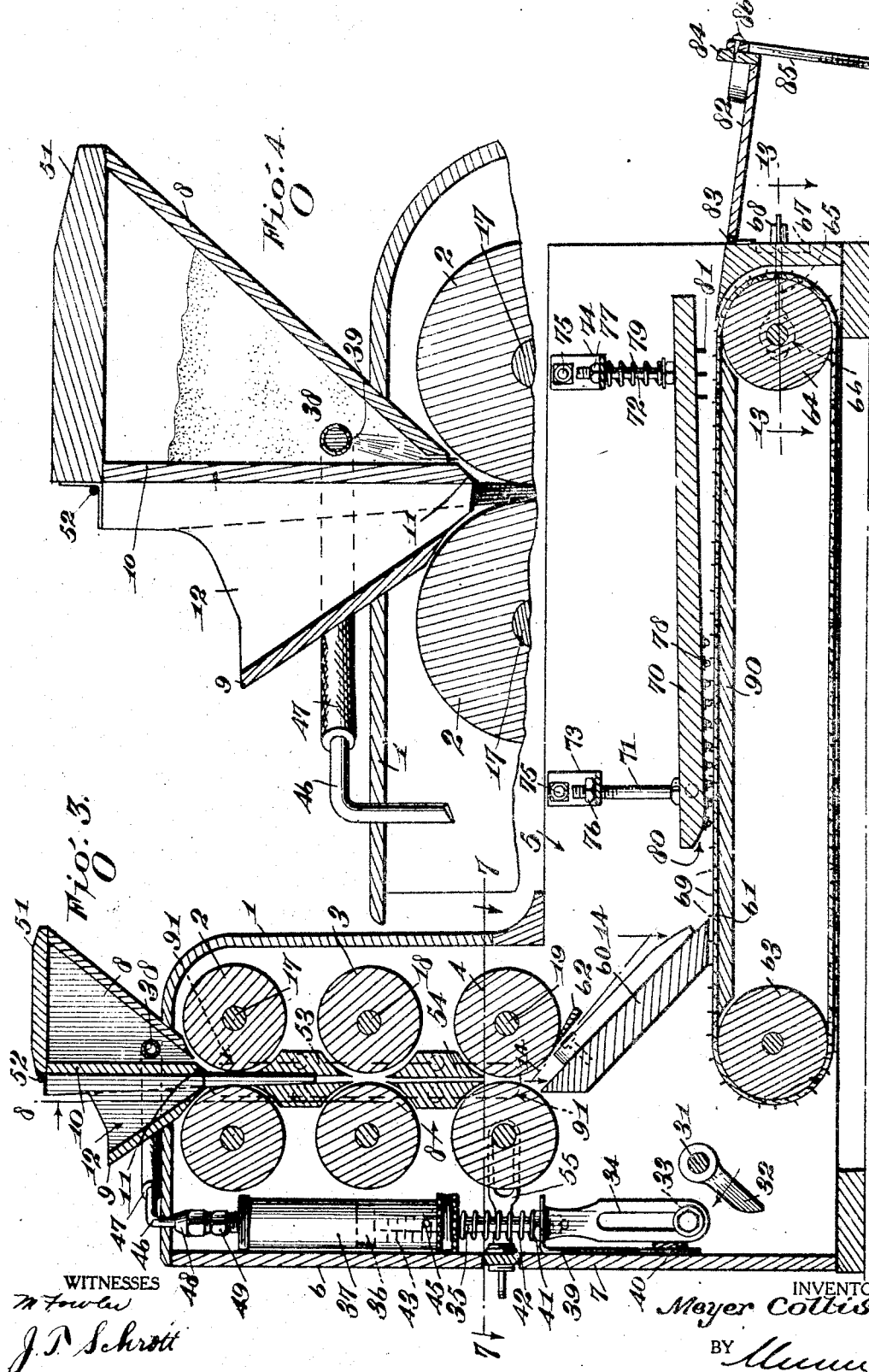

April 27, 1926. 1,582,382
M. COLLIS
HALF MOON ROLL MAKING MACHINE
Filed April 19, 1924   4 Sheets-Sheet 4
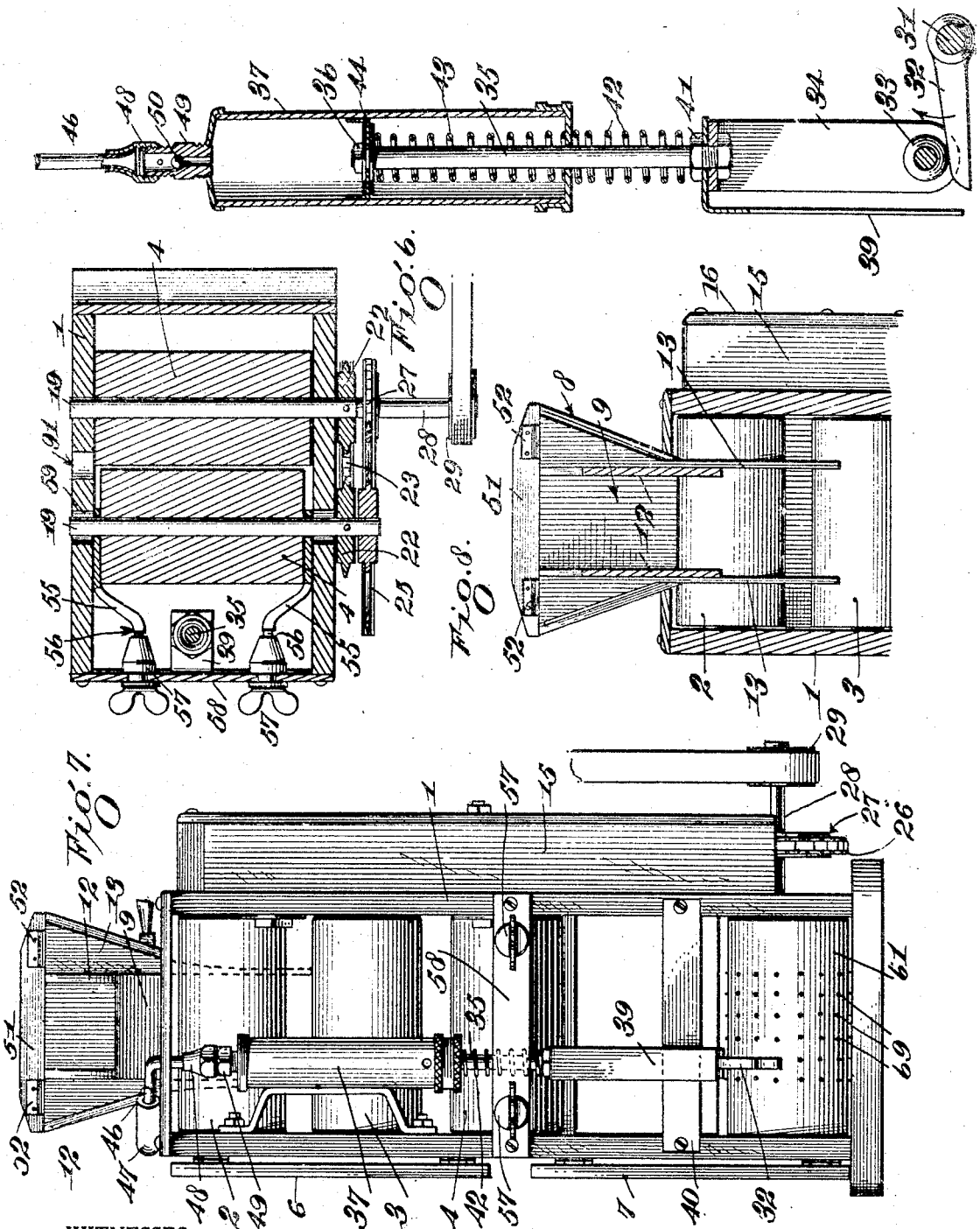
WITNESSES
INVENTOR
Meyer Collis
BY
ATTORNEYS Patented Apr. 27, 1926.

1,582,382

UNITED STATES PATENT OFFICE.

MEYER COLLIS, OF CHARLESTON, SOUTH CAROLINA.

HALF-MOON-ROLL-MAKING MACHINE.

Application filed April 19, 1924. Serial No. 707,718.

*To all whom it may concern:*

Be it known that I, MEYER COLLIS, a subject of Russia (who has taken out his first papers), and a resident of Charleston, in the county of Charleston and State of South Carolina, have invented certain new and useful Improvements in Half-Moon-Roll-Making Machines, of which the following is a specification.

This invention relates to improvements in machines for forming the dough preparatory to baking the rolls and it consists of the constructions, combinations and arrangements herein described and claimed.

An object of the invention is to provide a machine, capable of being driven either by hand or other power, for forming dough blanks into rolls preparatory to baking, the machine including a novel arrangement of rollers for flattening the dough, means for dusting the rollers with flour and means by which the dough blanks are rolled upon themselves before being finally discharged.

Another object of the invention, and one briefly mentioned in the foregoing statement, resides in the novel arrangement of an air pump which is so associated with a flour bin as to periodically discharge a blast of air and carry flour with it for the purpose of dusting the rollers.

Another object of the invention is to provide a pair of guides so associated with the two uppermost pairs of rollers as to limit the width to which the dough blanks may be flattened.

Another object of the invention is to provide a novel arrangement of spiked conveyor and associated presser board for the purpose of automatically turning the flattened dough blank upon itself and forming the roll.

Another object of the invention is to provide means for adjusting one of the lowermost pair of presser rollers permitting flattening the dough blank to any desired thickness.

Another object of the invention is to provide means for adjusting one of the conveyor rollers so that the belt may be tightened when required.

Other objects and advantages appear in the following specification, reference being had to the accompanying drawings, in which—

Figure 1 is a side elevation of the improved machine, the cover plate of the gear box having been removed to illustrate the arrangement of the various sprockets, etc. for turning the rollers.

Figure 2 is a plan view of the machine.

Figure 3 is a central longitudinal section.

Figure 4 is a detail sectional view of the dough hopper and flour bin, particularly illustrating the method of dusting the rollers.

Figure 5 is a rear elevation of the machine, the pair of doors being shown open to illustrate the mechanism on the inside.

Figure 6 is a detail sectional view of the air pump, also illustrating the back check valve which prevents the drawing of flour from the bin into the pump on the return stroke of the piston.

Figure 7 is a detail horizontal section of the machine taken on the line 7—7 of Figure 3 and illustrating the adjustment of one of the lower pair of rollers.

Figure 8 is a detail section on the line 8—8 of Figure 3, illustrating the guides by which the width of the dough blank is limited.

Figure 9 is a detail section of the dough rolling means, illustrating the action upon initial presentation of the blanks.

Figure 10 is a similar view illustrating the blank in the process of being rolled.

Figure 11 is a detail perspective view of the completed roll.

Figure 12 is a detail inverted perspective view of the presser board.

Figure 13 is a detail sectional view on the line 13—13 of Figure 3, illustrating the adjustment of the conveyor.

Figure 14 is a detail plan view of the inclined shelf as seen on the line 14—14 of Figure 3, showing the guide cleats for directing the dough into the center of the conveyor.

In carrying out the invention provision is made of an upright casing 1 which may be identified as the roller casing in that it houses three pairs of rollers 2, 3 and 4 which are for the purpose of gradually flattening the dough blank to the desired thickness before discharging it upon the rolling means in the casing 5. As clearly shown in Figure 3 the casings 1 and 5 communicate, and inasmuch as the casings join at right angles the machine has a somewhat exaggerated L-shape.

Doors 6 and 7 at the rear of the machine permit access to the interior when required. The roller casing 1 is almost completely enclosed when the doors 6 and 7 are shut, this being desirable and necessary to prevent flour, which is always suspended in the atmosphere within the casing to a greater or less degree, from escaping to the outside.

For the same purpose, it may be found desirable in practice to provide the casing 5 with a cover or door although the drawings show the casing to be open so that the mechanism on the inside may be clearly revealed in the plan view, Fig. 2. The sides and top of the roller casing 1 provide a foundation upon which the flour bin 8 and dough hopper 9 are mounted. These hoppers are divided by a common partition 10, this partition extending down near the upper pair of rollers 2 (Fig. 3) where it terminates in a sharpened or beveled edge 11 following the general shape or direction of the nearest roller. The reader will readily understand that the partition 10 separates the dough introduced at the hopper 9 and the flour contained by the bin 8.

The sides 12 of the dough hopper 9 are suitably affixed to the interior edges of a pair of guides 13 (Fig. 8) which extend down between the upper pair of rollers 2 (Figs. 3 and 13) for the purpose of properly directing the dough blank on its way through the various rollers and also for limiting the width of the dough blank. It is to be observed that the guides taper downwardly (Fig. 3) so as to fit between the upper pair of rollers.

Situated at one side of the roller casing 1 is another casing 15 (Figs. 1 and 2) hereinafter known as the gear box in that it contains or houses the various sprockets chains, etc., for driving the rollers 2, 3 and 4 as well as the pump and conveyor. That side of the casing 1 opposite the gear box 15 is slotted at 91 along the dough blank passage to permit observation of the progress of the blanks.

The gear box is closed by a cover 16 which, as stated before, is shown removed in Figure 1. The various pairs of rollers 2, 3 and 4 are carried by shafts 17, 18 and 19 which extend through the sides of the roller casing 1 and in practice will be provided with suitable bearings. The various pairs of shafts 17, 18 and 19 are provided with sprockets 20, 21 and 22 which are so driven that the rollers on opposite sides of the central line or dough passageway rotate in the same direction and cause the downward feeding of the dough blanks.

This is accomplished by training a single sprocket chain 23 over and under the various sprockets involved (Fig. 1) use being made of idlers 24 wherever necessary to both properly support the chain and permit of carrying over and under as stated. A large sprocket 25 on one of the shafts 19 of the lower pairs of rollers 4 furnishes the driving power for all of the rollers, such power being transmitted by a chain 26 from the sprocket 27 on the main drive shaft 28. This shaft extends out of the gear box 15 at one side and carries a pulley 29 (Fig. 2) to which a driving belt may be applied. In the event that it is intended to operate the machine by hand the drive pulley 29 will be substituted by a crank, the connection being made in any well known manner. The chain 26 (Fig. 1) also runs over a sprocket 30 on a shaft 31.

This shaft carries an arm 32 (Fig. 3) which periodically engages the roller 33 by which the pump is operated. The roller is suitably mounted in the yoke 34 carried by the piston rod 35. This rod has a piston 36 which operates inside of the cylinder 37 and is for the purpose of discharging air at the blower tube 38 in the flour bin 8. This tube is perforated at 39, and the blast of air carries with it some of the flour in the bin 8 and serves to dust the various pairs of rollers 3 and 4 so that the dough will not stick when rolling the blank.

The yoke 34 is of an inverted U-shape providing a convenient mounting for the roller 33 and also for the piston rod 35. A bracket 39, of inverted L-shape, cooperates with a bar 40 in guiding the piston rod and yoke during reciprocation. The short end of the bracket is fastened upon the yoke 34 by the same nut 41 which secures the piston rod. The space between the bracket 39 and the adjacent edges of the yoke 34 is sufficient to provide a working fit for the bar 40.

A spring 42, situated between the lower head of the cylinder 37 and the nut 41 returns the piston 36 upon release by the arm 32 after an upward movement. A spring 43 between the piston 36 and the lower head of the cylinder on the inside limits the movement of the piston under the influence of the spring 42. In other words, the springs 42 and 43 serve to neutralize the position of the piston 36 and keep the roller 33 in that position in which it will be engaged by the arm 32 most effectively. The piston 36 has a cup leather 44 which contracts and spreads to respectively let air pass and to compress air very much on the order of an ordinary bicycle pump.

Air is admitted to the cylinder 37 at the bottom through one or more openings 45. Connection is made between the top of the cylinder and the blower tube 38 through a pipe 46 which includes a flexible section 47.

The pipe 46 and tube 38 might be made continuous, but it is preferable to connect the two by a flexible section and thereby make better connection. A coupling 48 joins the pipe 46 with the cage 49 which contains the ball check valve 50. This check valve permits the escape of air on the upward stroke of the piston 36 and prevents flour being drawn back from the bin 8 on the return stroke of the piston.

A cover 51 is necessary for the flour bin 8. This cover is hinged at 52, and must be made to fit the bin all around so that the flour may not be blown out at the top upon the discharge of a blast of air at the tube 38. It is to be observed (Fig. 3) that the various pairs of rollers are situated at increasing distances apart toward the top of the cage 1. The space between the pair 2 is widest, the space between the pair 3 a little narrower and the space between the pair 4 the narrowest of all. The latter space is adjustable, but the rollers of the other pair are relatively fixed.

Pairs of guides 53 and 54 supplement the guides 13 in controlling the movement of the dough from the hopper 9 to the place of discharge of the blanks. These various guides provide a passage which confines the dough to the center, the guides 53 and 54 preventing the dough from wrapping around any one of the various rollers. The space between the guides 53 is wider than that between the guides 54, this arrangement being in conformity with the spacing of the rollers themselves.

Adjustment of the space between the rollers 4 of the lowermost pair are made by means of arms 55 (Fig. 7) which fit around the shaft 19 of the rearmost roller 4 and then are bent inward toward each other and rearward where they terminate in threaded studs 56. These studs are screwed into nuts 57 which are swiveled upon a bar 58 which runs across the back of the machine in a manner similar to the bar 40 upon which the pump piston rod is guided. Upon turning the swivel nuts 57 the shaft 19 of the rearmost roller is moved back and forth in slots 59 in the casing sides, thereby varying the space between the lowermost rollers and regulating the final thickness of the dough blank.

This blank is discharged upon an inclined shelf 60 (Fig. 3) which extends from a place between the lowermost rollers 4 to a place immediately above the conveyor belt 61. A scraper 62, working against that roller 4 immediately above the shelf 60 is for the purpose of preventing the dough blank from wrapping around that roller. The conveyor belt 61 is carried by a pair of rollers 63 and 64. The shafts of these rollers are in practice supported in suitable bearings, the foremost roller 64 being adjustable so that the belt 61 may always be kept under the proper tension.

The belt 61 runs over a platform 90 (Fig. 3), this being necessary to keep the belt from sagging when forming a roll. The shelf 60 carries a pair of guide cleats 92 (Fig. 14) for the purpose of directing the dough blank into the center of the belt. These are pivoted at 93 for lateral adjustment.

For this purpose there are bolts 65 (Fig. 13) which are threaded at one end and are suitably formed at the opposite end as at 56 to receive the ends of the roller shaft. The threaded ends extend through spacing plates 67 and carry wing nuts 68 which, upon being screwed in the proper direction, force the bolts 65 forward with the result that the belt 61 is tightened. Both wing nuts should be operated together so that there may be uniform tension on the belt.

The conveyor belt 61 is provided with numerous sharp spikes 69 which are arranged in longitudinal and cross rows (Fig. 5) to provide an ample gripping surface upon which the dough blank is caught upon discharge from the shelf 60 (Fig. 3) and by which the blank is conducted through the casing 5 in the process of making the roll. To this end, co-operation of a presser board 70 is had. This presser board is loosely supported above the belt 61 by pairs of studs 71 and 72 which in turn are pendant from bridges 73 and 74 extending across the casing 5. The ends of the bridges are bent up and are permanently secured inside of the casing by means of bolts 75. The lugs are all threaded and carry nuts 76 and 77 respectively for the purposes of adjustment.

These nuts rest upon the bridges and suspend the presser board 70 in the desired position. The rear end of the presser board is slightly lower than the front end (Fig. 3), in other words, is closer to the belt 61, this being for the purpose of insuring that dough blanks shall be gripped by the buttons 78 beneath the board. The front end of the board is supported a little higher from the belt, but the supporting struts 72 carry light springs 79 which are for the purpose of insuring the proper seaming of the roll upon completion.

It is to be observed that the under rear edge of the presser board 70 is slightly rounded or beveled at 80 (Figs. 3 and 12) producing what might be called a throat. It is into this throat that the dough blank is introduced upon discharge onto the shelf 60, the initial action of rolling the blank being illustrated in Figure 9. The buttons 78 beneath the presser board offer resistance to the forward passage of the dough. The conveyor belt 61 in moving forwardly tends to carry the dough forwardly and the result is that the dough blank is rolled over in the form of a spiral. As the size of the roll increases the presser board 70 raises, and when the roll finally reaches a place near the discharge end of the casing 5 a plurality of spikes 81 serve to insure the lapping of the end of the blank upon the roll so that it will not come undone when the roll is discharged upon the tray 82.

This tray is hinged at 83 so that if desired it may be turned into the upright position at the end of the casing 5. The tray has a ledge 84 which prevents the rolls from falling off, and the ledge carries a leg 85 furnishing the necessary support. This leg is pivoted at 86, and may be slightly turned on the pivot in either of two directions so as to produce a little variation in the slant of the tray. The tray carries curved blocks 94 (Fig. 2) which shape the roll into a crescent or half moon (Figs. 2 and 11) as the roll moves down upon the tray.

The operation is as follows: Pieces of dough are introduced into the hopper 9 either by hand or otherwise. The piece of dough enters the space between the first pair of rollers 2 (Fig. 3) where the flattening operation begins, such operation being continued between the pairs of rollers 3 and 4 which last pair discharge the dough blanks upon the inclined shelf 60 at the final and desired thickness.

It is to be observed that three pairs of rollers are used, and that each pair is spaced different from the other. It is necessary to gradually reduce the thickness of the dough because it is not advisable to attempt to reduce a piece of dough to a given thickness in merely one operation. Use is made of guides 13 (Fig. 8), 53 and 54 (Fig. 4) for keeping the dough blank in the central passage between rollers. The guides 13 being disposed at the ends of the rollers 2 limit the width of the dough blank at the beginning of the flattening operation. The guides 53 and 54 keep the blank in the center and prevent it from wrapping around one of the rollers.

It is possible to adjust the thickness of the dough blank by moving the rear one of the lowermost pair of rollers 4 either backward or forward, the swivel nuts 57 being made use of for the purpose. Provision is made for dusting the various rollers with flour. The bin 8 holds a supply. There is a perforated blower tube 38 near the bottom of the bin, and at intervals air discharging at the perforations carries a puff of flour into the rolling space. This function is accomplished by a pump 37 which is operated by an arm 32 on a shaft 31.

This shaft is driven simultaneously with all other shafts involved (Fig. 1) and the arms periodically lift the yoke 34 of the pump system so that air is forced through the connections 46 and 47 and out at the tube 38, as stated.

The action of revolving the dough blank so that the final product shown in Figure 11 is produced is well illustrated in Figures 9 and 10. As soon as the discharged dough blank slides down the shelf 60 and reaches the inclined surface of the float 80 (Fig. 3) a curling action takes place in this manner: The presser board 70 with its buttons 78 offers a resistance to the forward passage of the blank. The conveyor with its spikes 69 on the other hand, carries the blank forward. The result of the two actions is to curl the roll over so that it is rolled into a spiral as shown in Figure 10. The presser board 70 raises as the size of the roll increases, and by the time the roll is about ready to be discharged the spikes 81 serve to fix the last or lapped end of the roll so that it will not very readily become undone.

It is to be observed that there is quite a long unobstructed portion on the underside of the presser board 70. This portion occurs between the buttons 78 and spikes 81. This place is for the purpose of moving the roll as much as possible so that when it is once discharged an undue number of indentations will not appear. The dough blank upon being discharged at the shelf 60 is not of rectangular shape, but rather is of a leaf or oval shape. This shape is a natural consequence of the action of the various rollers 2, 3 and 4 and incidentally this particular shape of the blank makes it possible to more readily initiate the curling function illustrated in Figure 9.

It has been stated before that the machine may be driven either by hand or by machine power. In the latter instance the pulley 29 on the drive shaft 28 (Fig. 2) is made use of. In the former instance the pulley 29 would be replaced by a crank. Such use is readily understood and does not require specific illustration.

While the construction and arrangement of the improved roll making machine is that of a generally preferred form, obviously modifications and changes may be made without departing from the spirit of the invention or the scope of the claims.

I claim:

1. A machine for the purpose described comprising a flour bin, a plurality of rollers through which dough passes to be flattened, driving means for the rollers, means for producing intermittent blasts of air in said bin to discharge quantities of flour for dusting the rollers and preventing sticking of the dough, and means operated by the driving means producing intermittent operation of said air blast means.

2. A machine for the purpose described comprising a dough hopper, an adjoining flour bin, a perforated tube situated in the bin, an air pump in connection with said tube, a plurality of rollers through which the dough passes to be flattened, and means for both driving the rollers and operating the pump to produce blasts of air at said tube to discharge quantities of flour for dusting the rollers.

3. A machine for the purpose described comprising a dough hopper, an adjoining flour bin, a common partition dividing the hopper and bin, a pair of rollers situated at the outlets of the hopper and bin, said rollers receiving the dough from the hopper for flattening, a tube situated near the bottom of the flour bin and having openings directed toward the flour outlet, a pump in connection with the tube, driving means for the rollers, and means operated by said driving means for periodically operating the pump to deliver a blast of air at said tube and out of the flour bin outlet to dust the rollers.

4. A machine for the purpose described comprising a pair of rollers, a dough hopper and flour bin each having outlets directed between the rollers, a tube situated near the bottom of the flour bin having perforations directed toward the outlet, a pump having a connection with the tube, said pump including a piston and piston rod, means carried by the piston rod supporting a roller, means for driving the flattening rollers, and means including a shaft actuated by said driving means and having an arm for periodically engaging the pump roller to operate the piston and force a blast of air out of said tube to dust the flattening rollers.

5. A machine for the purpose described comprising a pair of rollers, a dough hopper and flour bin each having outlets directed between the rollers, a tube situated near the bottom of the flour bin having perforations directed toward the outlet, a pump having a connection with the tube, said pump including a piston and piston rod, means carried by the piston rod supporting a roller, means for driving the flattening rollers, means including a shaft actuated by said driving means and having an arm for periodically engaging the pump roller to operate the piston and force a blast of air out of said tube to dust the flattening rollers, and means including a cover fitted tightly upon the flour bin to prevent the air blast from blowing the flour out of the top of the bin.

6. A machine for the purpose described comprising a pair of rollers, a dough hopper and flour bin each having outlets directed between the rollers, a tube situated near the bottom of the flour bin having perforations directed toward the outlet, a pump having a connection with the tube, said pump including a piston and piston rod, means carried by the piston rod supporting a roller, means for driving the flattening rollers, means including a shaft actuated by said driving means and having an arm for periodically engaging the pump roller to operate the piston and force a blast of air out of said tube to dust the flattening rollers, means including a back check valve in said pump connection permitting the escape of air from the pump but preventing drawing air and flour into the pump from the flour bin.

7. A machine for the purpose described comprising a casing, a pair of spaced rollers situated in the casing, a hopper at which dough is introduced between the rollers, an adjoining flour bin, a perforated tube situated in the flour bin, a pump for delivering blasts of air to the tube discharging flour from the bottom of the bin for dusting the rollers and preventing the dough from sticking, a piston and piston rod included in the pump, driving means for the rollers, means including a shaft having an arm rotated by said driving means, means including a yoke having a roller carried by the piston rod to be periodically engaged by the arm for the operation of the pump, a bracket carried by the piston rod defining a passage, and a bar mounted on the casing occupying said passage and providing a guide for the piston rod during reciprocation.

8. A machine for the purpose described comprising a casing, a pair of spaced rollers situated in the casing, a hopper at which dough is introduced between the rollers, an adjoining flour bin, a perforated tube situated in the flour bin, pump for delivering blasts of air to the tube discharging flour from the bottom of the bin for dusting the rollers and preventing the dough from sticking, a piston and piston rod included in the pump, driving means for the rollers, means including a shaft having an arm rotated by said driving means, means including a yoke having a roller carried by the piston rod to be periodically engaged by the arm for the operation of the pump, a bracket carried by the piston rod defining a passage, a bar mounted on the casing occupying said passage and providing a guide for the piston rod during reciprocation, and springs mounted on the piston rod at opposite sides of the pump head to neutralize the position of the piston, the inner spring limiting the outward movement of the piston, the outer spring serving to return the piston after operation by said arm.

9. A machine for the purpose described comprising a casing, a pair of spaced rollers situated in the casing, a hopper at which dough is introduced to the rollers, an adjoining flour bin, a perforated tube situated in the bin near the bottom, a pump situated in the casing including a cylinder mounted therein and including an air connection to the tube, said pump delivering periodic blasts of air to the tube for discharging flour to dust the rollers, means for driving the rollers including means for operating the pump, said last means including an arm, a pump piston having a rod having means to be periodically engaged by said arm, and means carried by the piston rod and other means carried by the casing for guiding the piston rod during reciprocation.

10. A machine for the purpose described comprising rollers for forming a dough blank, a spiked conveyor belt upon which said blank is discharged and by which it is carried in one direction, a presser board located above the belt being beveled at one end to form a throat and being provided with buttons offering resistance to the passage of the blank when moving in said direction, thereby curling the blanks to form a roll, means including a plurality of spikes situated beneath the board at the end opposite said buttons to properly lap and secure the end of the dough blank upon the roll, the intermediate portion of the board being smooth, and means by which the board is yieldably supported above said belt permitting raising of the board to accommodate the roll as the size thereof increases.

11. A machine for the purpose described comprising a casing, rollers contained thereby for forming a dough blank, and means also contained by the casing for rolling the blank, said means comprising a spiked endless conveyor belt upon which the blank is discharged, a presser board situated above the belt being beveled at one end to provide an entrance throat, buttons situated beneath the board near said end to offer resistance to the passage of the blank thereby causing curling thereof, means including a plurality of spikes at the opposite end of the board for finally lapping the blank upon the formed roll, supporting means including studs carried by the board, bridges fixed in the casing through which said studs pass, and means carried by the studs contacting the bridges for limiting the downward movement of the board toward the belt, said adjusting means being so fixed that the end of the board carrying the buttons is disposed closer to the belt than said spiked end.

12. A machine for the purpose described including means for forming a dough blank into a roll, means upon which the completed roll is discharged by said forming means, and stationary means against which the roll reclines being suitably shaped to form the roll into a half moon.

13. A machine for the purpose described including means for forming a dough blank into a roll, a slightly inclined tray upon which the completed roll is discharged, and blocks mounted on the tray having curved portions with which the roll contacts thereby shaping it into a half moon.

MEYER COLLIS.